(12) United States Patent
Agbabian et al.

(10) Patent No.: US 7,546,637 B1
(45) Date of Patent: Jun. 9, 2009

(54) STRUCTURES AND METHODS FOR USING GEO-LOCATION IN SECURITY DETECTORS

(75) Inventors: Paul Agbabian, Los Angeles, CA (US); William E. Sobel, Stevenson Ranch, CA (US)

(73) Assignee: Symantec Corproation, Mountain View, CA (US)

( * ) Notice: Subject to any disclaimer, the term of this patent is extended or adjusted under 35 U.S.C. 154(b) by 890 days.

(21) Appl. No.: 10/996,019

(22) Filed: Nov. 22, 2004

(51) Int. Cl.
 *H04L 9/00* (2006.01)
(52) U.S. Cl. .................... 726/23; 726/25; 713/151; 713/168; 709/223; 709/224; 709/232; 709/238
(58) Field of Classification Search ............... 726/23
See application file for complete search history.

(56) References Cited

U.S. PATENT DOCUMENTS

| | | | | |
|---|---|---|---|---|
| 6,757,740 B1 * | 6/2004 | Parekh et al. | ............... | 709/245 |
| 7,366,919 B1 * | 4/2008 | Sobel et al. | ............... | 713/150 |

OTHER PUBLICATIONS

Hu, X., et al, 'Accurate Real-time Identification of IP Hijacking', Univ. of Michigan, 2006, entire document, http://www.eecs.umich.edu/techreports/cse/2006/CSE-TR-516-06.pdf.*

U.S. Appl. No. 10/866,431, entitled "Structures and Methods for a low and Slow Network Reconnaissance Detector" of Paul Agbabian and Bruce McCorkendale filed on Jun. 10, 2004.
US 7,349,989, 03/2008, Parekh et al. (withdrawn)*

* cited by examiner

*Primary Examiner*—Kambiz Zand
*Assistant Examiner*—Ronald Baum
(74) *Attorney, Agent, or Firm*—Gunnison, McKay & Hodgson, L.L.P.; Forrest Gunnison

(57) ABSTRACT

Information, e.g., a source address, in packets on a network is processed by a geo-location detector The geo-location detector generates a related location identifier, which, for example, is inclusive of one or more source addresses, known or unknown. The location identifier serves as a less precise indicator than the exact location of the system associated with the particular source address of interest, but a more accurate location indicator than was previously available. One of the addresses in a set of source addresses represented by the location identifier is the source address of interest. Although other source addresses represented by the location identifier may not be attacker sources, the location identifier is an identity that can be used as a variable for correlation, trend analysis, or search keys in accessing a network security threat.

16 Claims, 7 Drawing Sheets

STRUCTURES AND METHODS FOR USING GEO-LOCATION IN SECURITY DETECTORS

BACKGROUND OF THE INVENTION

1. Field of the Invention

The present invention relates generally to computer network attacks, and more particularly to identifying a geographic region in which an attack or probe originated.

2. Description of Related Art

A variety of attacks on computer networks have been documented. A source, a target, and a type characterized most attacks. Various security management systems have been developed to assist in the recognition of attacks, e.g., the identification of the type of attack. Typically, log data from firewalls and intrusion detection systems (IDSs) was stored for subsequent analysis and use.

Sometimes before the log data was stored, attempts were made to correlate events in the log data to assist in identifying an attack, the start of an attack, or anomalous events that could indicate gathering of information for a subsequent different type of attack, for example.

Due to attackers using variable Internet Protocol (IP) addresses assigned from blocks allocated to Internet Service Providers (ISPs,) or using IP addresses that are cloaked behind known proxy servers, the IP source address may not serve as a valid identity of the potential attacker for the purposes of trend analysis, or search keys in security event databases. Thus, it is often difficult or impossible to obtain in useful information based upon the IP source address to identify the origin of an attack.

SUMMARY OF THE INVENTION

In one embodiment of the present invention, information, e.g., a source address, in packets on a network is processed by a geo-location detector. The geo-location detector generates a related location identifier, which, for example, is inclusive of one or more source addresses, known or unknown.

The location identifier serves as a less precise indicator than the exact location of the system associated with the particular source address of interest, but a more accurate location indicator than was previously available. Specifically, the source address is in a set of source addresses represented by the location identifier. Although other source addresses represented by the location identifier may not be attacker sources, the location identifier is an identity that can be used as a variable for correlation, trend analysis, or search keys in assessing a network security threat. Hence, the geo-location detector categorizes information representing a source of security related threats based on its geo-location, i.e., the geographical or physical locale from which the source originated.

In one embodiment, a network event is processed with a security event detector. Also, data associated with the security event detector is processed with a geo-location detector. The data associated with the security event detector, may be information from the network event, security data generated by the security event detector, or both.

In processing data associated with the security event detector with a geo-location detector, a source address in the network event is processed using a geo-location module. A location identifier for the source address is generated. In another embodiment, the processing data associated with the security event detector with a geo-location detector further generates a location identifier for the network event.

In this example, a system includes a processor and a memory coupled to the processor. The memory has stored therein instructions for a method for characterizing events on a network wherein upon execution of the instructions using the processor, the method includes:

processing a network event with a security event detector; and processing data associated with the security event detector with a geo-location detector.

In another embodiment, a plurality of network events are processed with a security event detector to identify a set of network events having a common source address and to generate a network security event for the set of network events. Also, a first occurrence of a network event having the source address in the plurality of network events is processed with a geo-location detector to generate a location identifier for the network event having the source address. A plurality of location identifiers is generated.

Location identifiers in the plurality of location identifiers are compared with a location criterion. The location identifiers having a predefined relationship with the location criterion are grouped to generate a common location event. The common location event includes a set of source addresses and associated location identifiers. The common location event and the network security event are used in generating a geo-location security event.

In one example, the processing a plurality of network events with a security event detector to identify a set of network events having a common source address and to generate a network security event for the set of network events further includes generating an interest level for each set of network events having a common source address thereby generating a plurality of interest levels. A set of interest levels from the plurality of interest levels is selected. Each interest level in the set has a specified relationship to a threshold interest level.

For this example, a system also includes a processor and a memory coupled to the processor. The memory has stored therein instructions for a method for characterizing events on a network. Upon execution of the instructions using the processor, the method comprises:

processing a plurality of network events with a security event detector to identify a set of network events having a common source address and to generate a network security event for the set of network events; and processing a first occurrence of a network event having the source address in the plurality of network events with a geo-location detector to generate a location identifier for the network event having the source address wherein a plurality of location identifiers are generated.

In still yet another embodiment, network events are processed using a low and slow reconnaissance detector. The low and slow reconnaissance detector generates an interest level for each set of unique network events. Thus, a plurality of interest levels is generated.

A set of unique network events is network events that have a common characteristic, e.g., the same source address, and that common characteristic is different from the characteristic in other network events, e.g., the common characteristic is unique to the network events in the set.

In this embodiment, the network events are also processed using a geo-location detector. The geo-location detector generates a location identifier for each set of unique network events. A plurality of location identifiers is generated.

A set of interest levels from the plurality of interest levels are selected. Each interest level in the set of interest levels is equal to or greater than a threshold interest level. Also, a set of location identifiers is selected from the plurality of location identifiers. Each location identifier in the set of location identifiers satisfies a location criterion. A subset of interest levels from the set of interest levels is selected. Each interest level in the subset is associated with a location identifier in the set of location identifiers, e.g., the interest level and the location identifier are associated the same common characteristic described above. For example, the interest level and the location identifier are associated with the same source address.

BRIEF DESCRIPTION OF THE DRAWINGS

In the drawings and the following detailed description, elements with the same reference numeral are the same or equivalent elements. Also, the first digit of the reference numeral is the figure number in which the corresponding element first appears.

DETAILED DESCRIPTION

Figure 1:
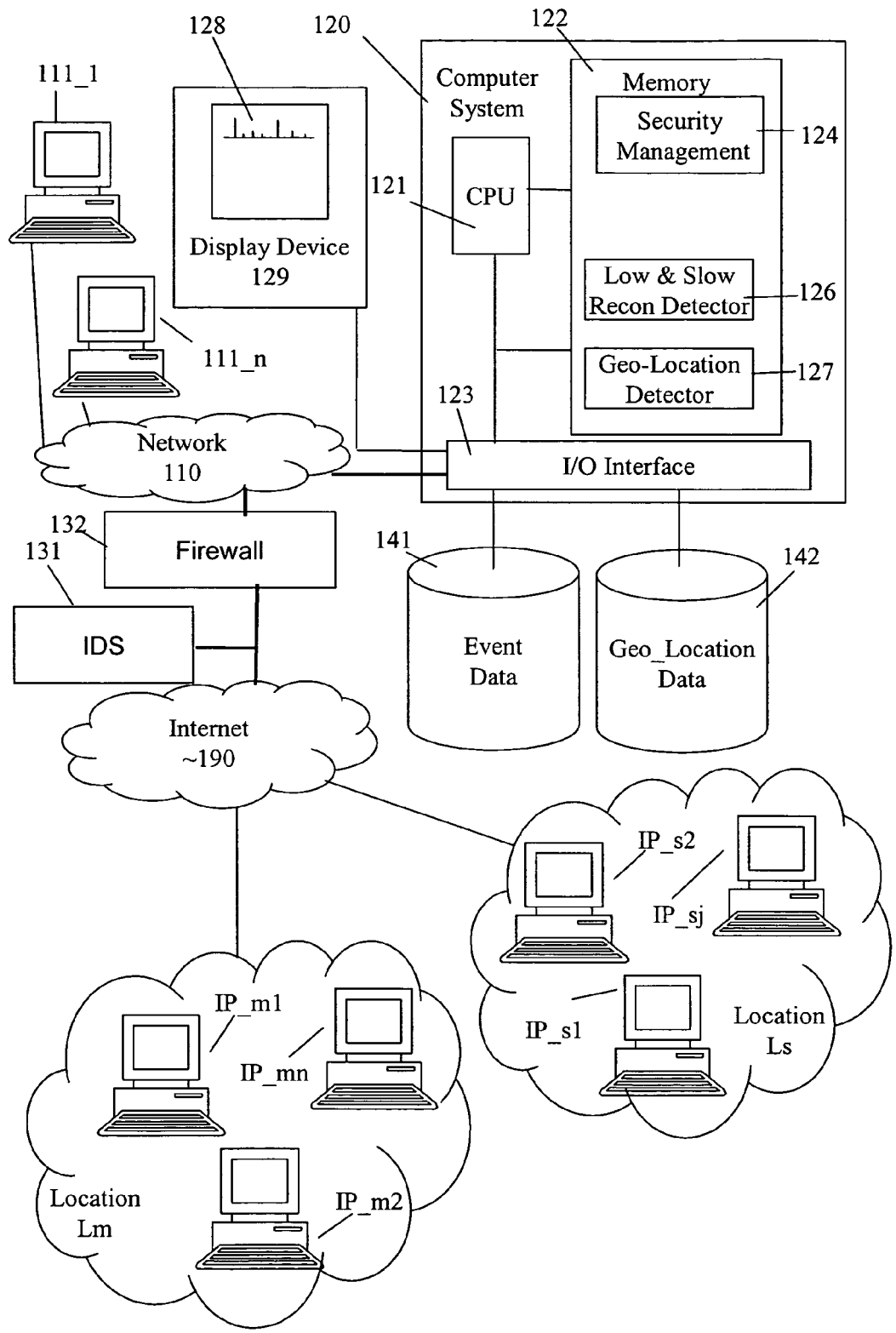
FIG. 1 is an illustration of a computer network that includes at least one computer system that includes an embodiment of the geo-location detector according to one embodiment of the present invention.

In one embodiment of the present invention, a geo-location detector 127 processes information packets on a network 110. In this example, network 110 is coupled to Internet 190 via a firewall 132 and includes a plurality of computer systems, e.g., computer system 120 with display device 129, event database 141 and geo-location database 142, and nodes 111_1 to 111_n. In one embodiment, geo-location detector 127 processes source addresses, such as Internet Protocol (IP) source addresses, and generates a related location identifier L, which is inclusive of one or more source addresses, known or unknown.

Location identifier L serves as a less precise indicator than the exact location of the system associated with the particular source address of interest, but a more accurate location indicator than was previously available. Specifically, one of the addresses that are in a set of source addresses represented by location identifier L is the source address of interest. Although other source addresses represented by location identifier L may not be attacker sources, location identifier L is an identity that can be used as a variable for correlation, trend analysis, or search keys.

Hence, geo-location detector 127 categorizes addresses that represent a source of security related threats based on their geo-location, i.e. the geographical or physical locale from which the source addresses originate. As is known to those of skill in the art, geo-location databases, e.g. geo-location database 142, catalog addresses based on the presumed physical location of origin.

In the prior art, these databases were primarily used for market research and sales targeting by retailers that were trying to find local branches or franchises for a customer wanting their products or services. These databases are sometimes used to implement Internet yellow pages.

In this embodiment, geo-location data base 142 serves as the means for geo-location detector 127 to determine a location identifier $L\_j$ based on a given source IP address $IP\_i$. The use of a source IP address is illustrative only and is not intended to limit the invention to this particular embodiment. Any parameter available from a source that can be used to identify a location of that source can be used.

In FIG. 1, IP addresses $IP\_mi$, where i ranges from 1 to n, are associated with location identifier Lm. IP addresses $IP\_si$, where i ranges from 1 to j, are associated with location identifier Ls. In general, location identifier L could be a certain facility, an ISP, or perhaps a continent. The size of the location associated with location identifier L typically defines the particular number of IP addresses associated with that location identifier.

In one embodiment, a sample space S of valid IP addresses is defined as:

$$S=\{IP\_i\}$$

where IP is an Internet Protocol source address; and
i is in the range of integers that make up the numbers within the Internet Protocol version four, or alternatively the Internet Protocol version six.

Figure 2:
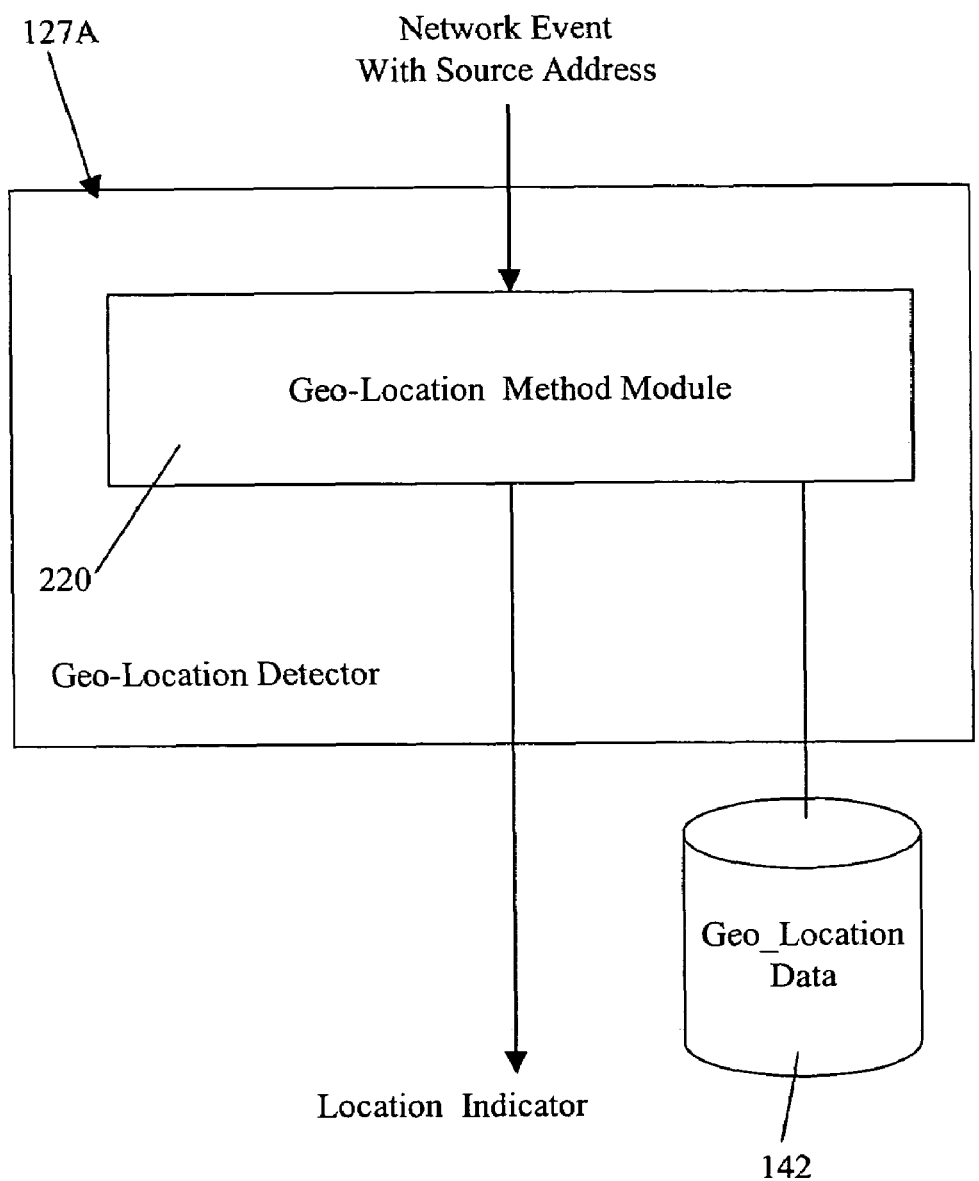
FIG. 2 is one embodiment of the geo-location detector including a geo-location method module.

FIG. 2 is a more detailed diagram of one embodiment of geo-location detector 127A. Geo-location method module 220 includes a geo-location function $G(IP\_i)$, where $IP\_i$ is an input source address. Execution of module 220 and consequently geo-location function $G(IP\_i)$ generates an output location identifier $L\_j$ that represents a particular location associated with input source address $IP\_i$ in geo-location database 142, where input source address $IP\_i$ is any one of the valid IP addresses in sample space S.

A given input source address $IP\_i$ to geo-location detector 127A produces a single result, i.e., location identifier $L\_j$, which is relatively time-invariant. Here, j spans the range of locations available in geo-location database 142, and i spans the number of addresses for a particular protocol.

The output of geo-location detector 127A can be longitude and latitude coordinates, which are the most flexible units for the location identifier. Longitude and latitude coordinates allow proximity calculations to effectively "zoom out" onto larger locations to identify potential attackers that may be working out of a particular part of the world.

Figure 3A:
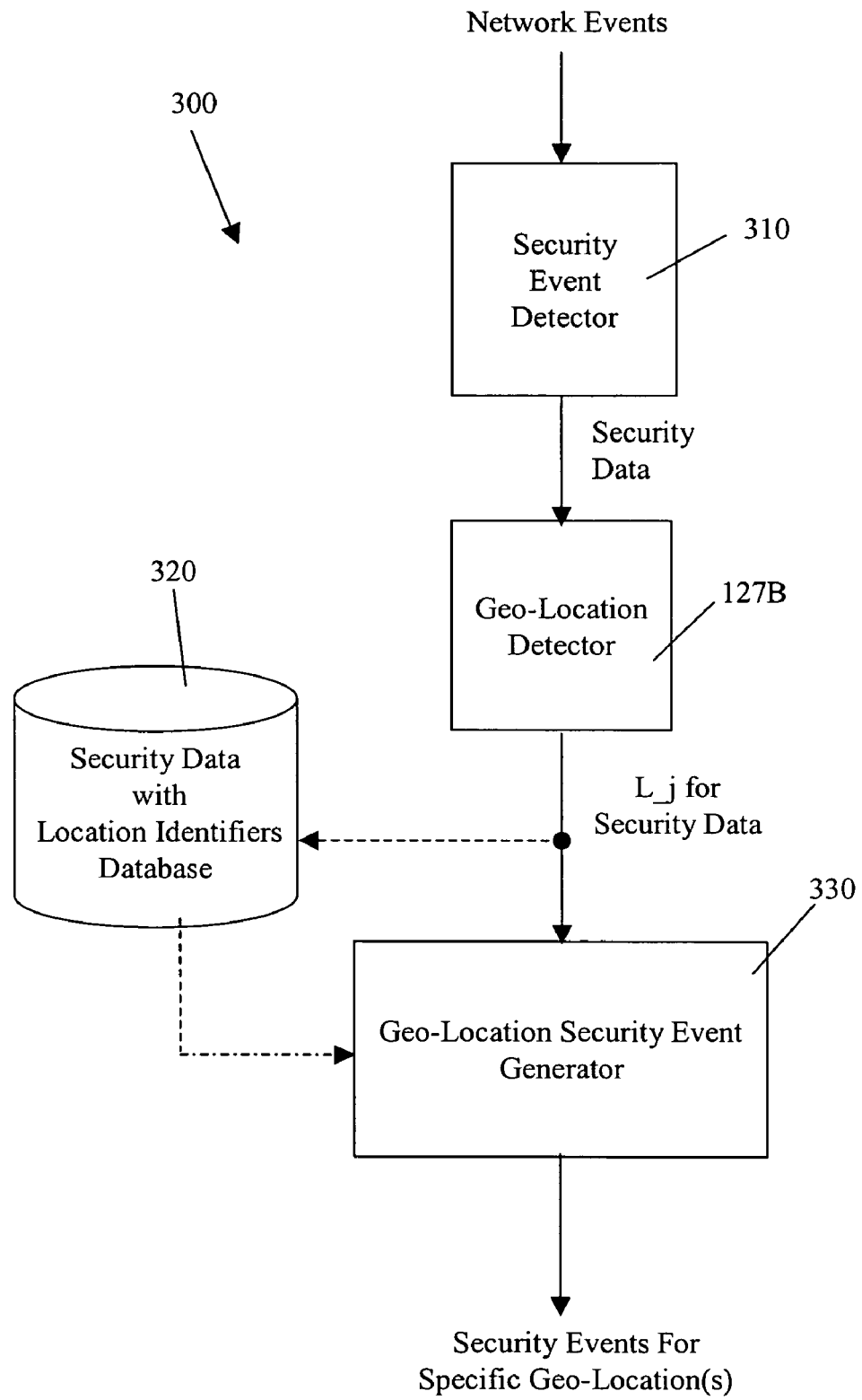
FIG. 3A is an embodiment of a system that includes a security event detector and a geo-location detector that processes data associated with the security event detector, which in this embodiment is security data.

Relatively fast, in memory implementations of geo-location function $G(IP\_i)$ are available in the marketplace, and so this technique can be applied to a number of security applications. FIG. 3A is one example of a security system 300 according to one embodiment of the present invention.

System 300 includes a security event detector 310 that receives network events and generates what is called security data. A network event is a packet on network 110 with a particular characteristic such as a source IP address $IP\_i$.

The security data generated by security event detector 310 can be an actual security event or information that is analyzed further to determine whether a security event should be declared, for example. Those of skill in the art know the information generated by a particular security event detector, or security application and how that information is utilized.

However, system 300 is more robust than the systems that included only security event detector 310. The security data output from security event detector 310 is further processed by geo-location detector 127B. In the security data from security event detector 310 are source IP addresses, for example, associated with the security data. Alternatively, information could be passed to geo-location detector 127B that allows geo-location detector 127B to access an event database and to retrieve the information required by geo-location detector 127B to associate a location identifier, or location identifiers with the security data.

A location identifier $L\_j$ associated with each instance of the security data, in this embodiment, is processed by geo-location security event generator 330. Geo-location security event detector 330 processes location identifiers $L\_j$, where j ranges from 1 to the number of locations identifiers and groups the security data by geographic location. This data can be further analyzed and the result of that analysis presented, or this data can be presented in a graphical display on display device 129 (FIG. 1).

Applications where the location identifiers are particularly useful include real-time techniques such as low and slow reconnaissance detectors, e.g., low and slow reconnaissance detector 126, and centralized event logging systems that in this example are implemented by security management system 124. The combination of the two makes for a more robust low and slow reconnaissance detector system, because it becomes more difficult to spoof via multiple attacks over relatively long periods of time (e.g. via a dial-in connection and general DHCP address allocations).

Figure 3B:
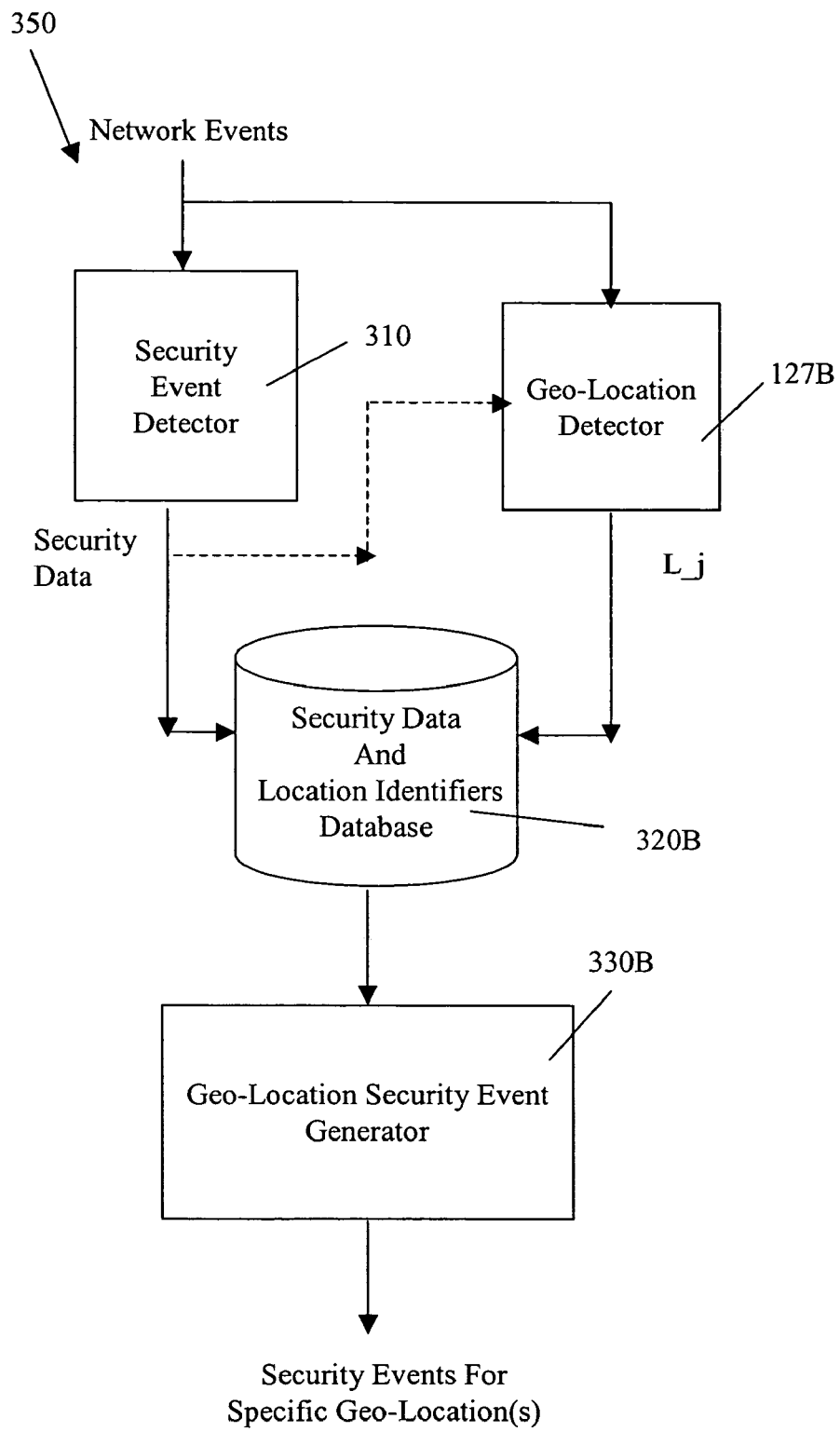
FIG. 3B is an embodiment of a system that includes a security event detector and a geo-location detector that processes data associated with the security event detector, which in this embodiment are network events.

In the embodiment of FIG. 3A, only the output from security event detector 310 is processed by geo-location detector 127B. In the embodiment of FIG. 3B, system 350 processes network events using security event detector 310 and geo-location detector 127B. If desired, geo-location detector 127B can also process information in the security data generated by detector 310.

In one embodiment, each location identifier $L\_j$ associated with a network event and the corresponding security data are stored in a security data and location identifiers database 320B, in this embodiment. Database 320B can also store a count for each time a particular location identifier $L\_j$ is output by detector 127B, i.e., the number of network events associated with a particular location identifier $L\_j$. Also, only the first occurrence of a network event may be processed by geo-location detector 127B.

While in FIG. 3B, a database is positioned between detectors 310 and 127B and generator 330B, this is illustrative only and is not intended to limit the invention to this particular configuration. Alternative, both the security data from detector 310 and the location identifiers from detector 127B could be passed in real time to generator 330B for further processing.

In this embodiment, the data in database 320B is processed by geo-location security event generator 330B. For example, geo-location security event generator 330B generates, for example, a regional map with color-coding to show the location of the geographic region that was the origin of network events related to network security events and a colored circle for each region where the diameter of the circle represents the number of security events that originated in that region. Other graphical representations can be used to show the number of security events that originated from a particular geographical region for example. The ability to associate geographical information with the data in visual representations provides a new level of understanding when analyzing security threats.

Various embodiments of low and slow reconnaissance detector 126 may be used in system 300 or system 350, for example. In one embodiment, packets on a network 110 (FIG. 1) are low pass filtered using low and slow network reconnaissance detector 126 to generate a spectrum of packets that are anomalous, i.e., are not commonly occurring IP packet traffic on network 110.

The particular spectrum of packets created by low and slow network reconnaissance detector 126 can be based upon any one of a source address, a destination address, a source port and a destination port, or any other information in the packet that may be useful in identifying a packet as anomalous. In embodiments that are not performed using a real-time data stream, or in embodiments that utilize time, e.g., a time interval, a timestamp for the packet may be used along with the information in the packet used in identifying the packet as anomalous Low and slow network reconnaissance detector 126 quickly and efficiently identifies packets that occur infrequently in a stream of network traffic. Information from the identified packets can be used as search keys by a security management system 124 when querying security events in an event database 141 or other data store of security management system 124. In particular, an associative correlation from the information to events or alerts reported by an intrusion-detection system 131 provides early warning that a low-amplitude or surveillance probe may be occurring.

In one embodiment, output from low and slow network reconnaissance detector 126, i.e., low pass filtered data, is presented as a graphical display 128 on a display device 129. The peaks in graphical display 128 represent the anomalous packets on network 110. The peaks represent interest levels of sets of IP packets.

While there is no causal relationship from information in the low-pass filtered data to actual attacks, information in the low-pass filtered data provides a simple highly efficient tool for a security analyst to use in near real time to identify signals in the noise of security management system 124. In some environments, low-frequency packets with foreign addresses generally may be suspicious, and display of these addresses on display device 129 as a watch list may be useful to the security analyst.

In the following example, network 110 and low and slow network reconnaissance detector 126 are described as using the Internet Protocol (IP). However, this is illustrative only and is not intended to limit the invention to IP packets. Also, low and slow network reconnaissance detector 126 is illustrated on the same computer system 120 as security management system 124 for convenience only. An instance of low and slow network reconnaissance detector 126 can be located on any, all, or any desired combination of hosts on network 110. However, detector 126 also can be independent of any host so that detector 126 can see packet data at the same tier as a firewall or network intrusion detection device.

Figure 4A:
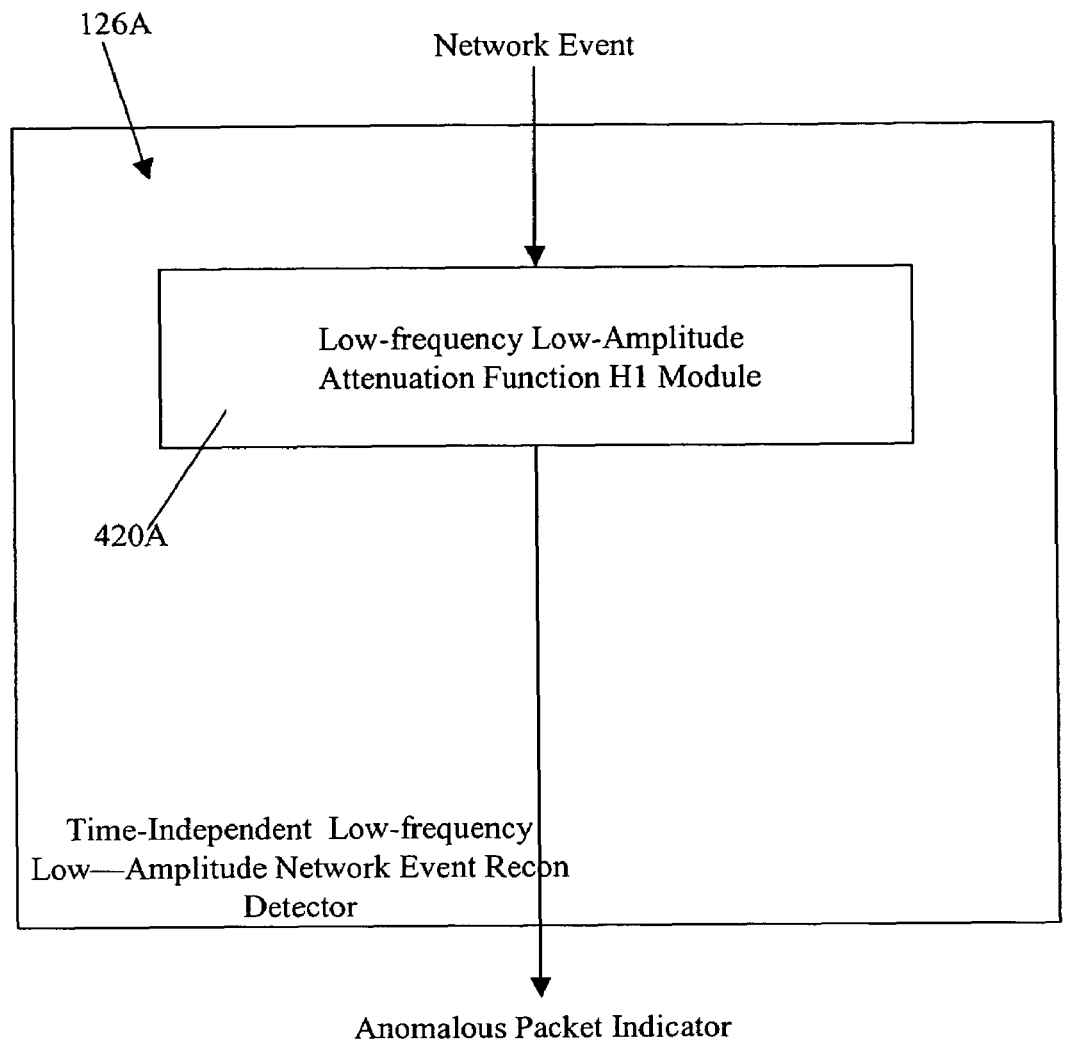
FIG. 4A is one embodiment of the low and slow incident detector that is a time-independent low-frequency low-amplitude network event reconnaissance detector including a low-frequency low-amplitude attenuation function H1 module.

In one embodiment, low and slow network reconnaissance detector 126A (FIG. 4A) is a time independent low-frequency low-amplitude network reconnaissance detector. Low and slow network reconnaissance detector 126A detects low and slow network reconnaissance by tracking (i) source IP address $IP\_j$ and (ii) occurrences of that source IP address. Low and slow network reconnaissance detector 126A uses an interest level $M(IP\_j)$ to indicate the occurrences of a particular source address IP_j, i.e., the occurrences of a network event having a particular characteristic.

Interest level M(IP_j) is attenuated based on the previous cumulative occurrence of source IP address IP_j. Thus, the interest level for frequent traffic is at or near zero, while the interest level for infrequent traffic is closer to the initial value of interest level M(IP_j), e.g., one.

In this embodiment, a low-frequency low-amplitude attenuation function H1 module 420A initially sets interest level M(IP_j) to one on the first occurrence of a given source IP address IP_j. On subsequent incidences of the same source IP address IP_j, interest level M(IP_j) is attenuated using an attenuation function H1. Several possible attenuation functions can be used depending on how quickly interest level M(IP_j) should be decreased with repeated occurrences.

As explained more completely in commonly assigned U.S. patent application Ser. No. 10/866,431, entitled "Structures and Methods for a Low and Slow Network Reconnaissance Detector" of Paul Agbabian and Bruce McCorkendale filed on Jun. 10, 2004, which is incorporated herein by reference in its entirety, the low-frequency low-amplitude attenuation function H1 module lends itself to an inexpensive implementation because a very small amount of data and processing is necessary for each network event and because data is only kept for source IP addresses, i.e., network events with a specific characteristic, which are seen. At any given time, the source IP addresses with an interest level above some threshold are easily determined. These source IP addresses make good search keys for further analysis within the framework of a more traditional IDS or security operations center.

In this embodiment, low-frequency low-amplitude attenuation function H1 module 420A is useful for detecting low and slow probes such that the number of occurrences do not attenuate interest level M(IP_j) below a critical value. Ideally, this critical value and the attenuation function are selected so the number of occurrences required to attenuate interest level M(IP_j) below the critical value is such that normal security apparatuses and/or processes detect the intrusion, for example.

While useful, this embodiment of low and slow reconnaissance detector 126 does not take time into consideration. Using only the low-frequency low-amplitude attenuation function H1 module, if the module is allowed to run long enough without re-initialization, an attacker that initially stands out within timeframe T (e.g., 1 month), but who repeatedly returns every timeframe T eventually ends up with an attenuated interest level that is below the interest level threshold after N intervals (where N is dependent on the attenuation function).

Figure 4B:
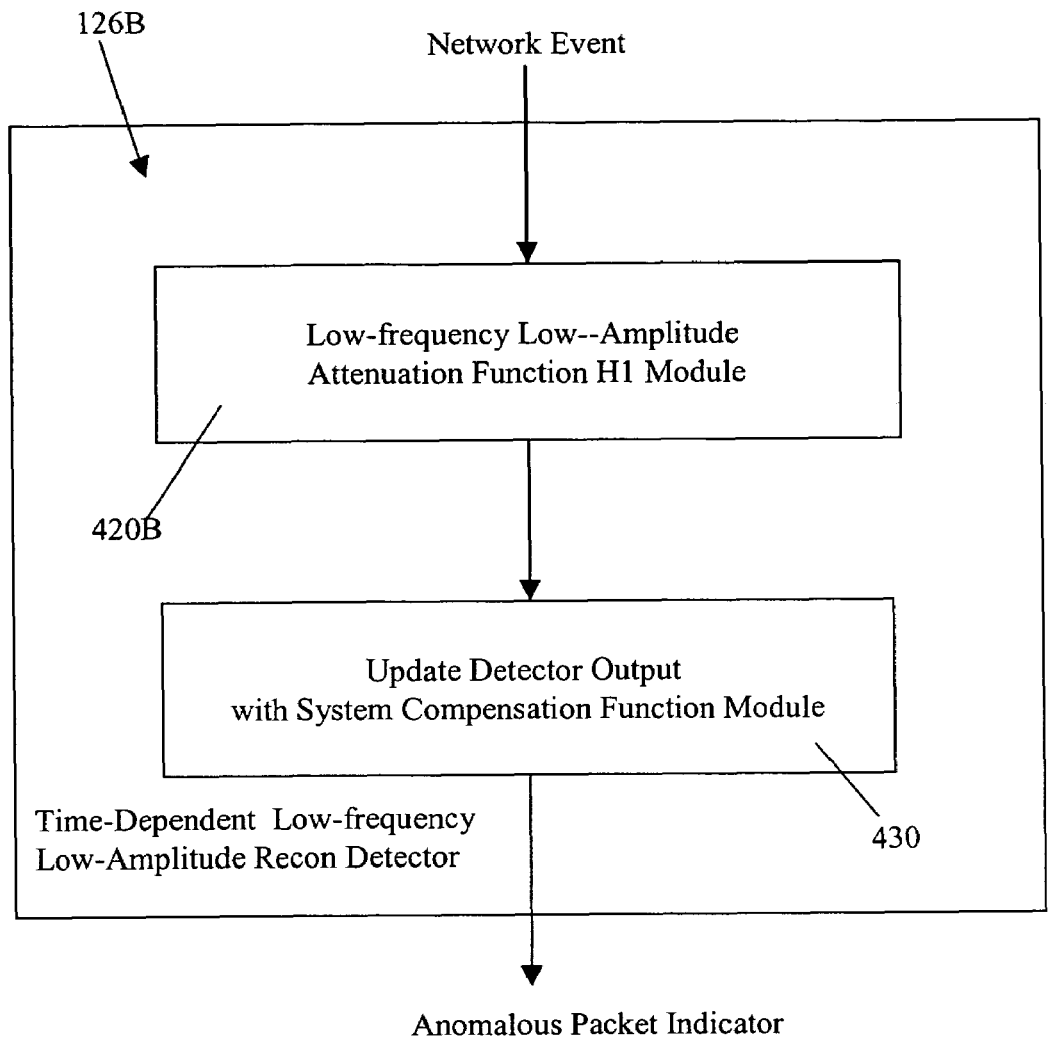
FIG. 4B is another embodiment of the low and slow incident detector that is a time-dependent low-frequency low-amplitude network event reconnaissance detector including a low-frequency low-amplitude attenuation function H1 module and an update detector output with system function H2 module.

To provide a more robust low and slow network reconnaissance detector 126, a time-dependent low and slow network reconnaissance detector 126B (FIG. 4B) is utilized. Time-dependent low and slow network reconnaissance detector 126B detects low and slow network reconnaissance by tracking (i) source IP address IP_j and (ii) occurrence per time unit of that source IP address.

As explained more completely in commonly assigned U.S. patent application Ser. No. 10/866,431, entitled "Structures and Methods for a Low and Slow Network Reconnaissance Detector" of Paul Agbabian and Bruce McCorkendale filed on Jun. 10, 2004, in one example of this embodiment, the time unit is a uniform bucket width and each bucket is considered to have an occurrence if one or more instances of source IP address IP_j occur in the bucket, and otherwise is considered not to have an occurrence. Time-dependent low and slow network reconnaissance detector 126B also uses an interest level M(IP_j) to indicate the occurrence per time unit of a particular source IP address IP_j.

Interest level M(IP_j) is first attenuated based on the previous cumulative occurrence per time unit of source IP address IP_j and then adjusted for the time dependence of the occurrences. Thus, the interest level for frequent traffic is at or near zero, while the interest level for infrequent traffic is closer to the initial value of interest level M(IP_j).

In the time dependent embodiment, the low-frequency low-amplitude attenuation function H1 module 420B again initially sets interest level M(IP_j) to one on the first occurrence of a given source IP address IP_j. On (i) a subsequent occurrence or occurrences of source IP address IP_j within a unit of time, interest level M(IPj) is attenuated by this module, as described above. In this embodiment, multiple occurrences of source IP address IP_j with a single unit of time are considered as a single occurrence. Several possible attenuation functions can be used depending on how quickly the interest should be decreased with repeated occurrences.

In the time dependent embodiment, an update detector output with system compensation function H2 module 430 is used in combination with low-frequency low-amplitude attenuation function H1 module 420B. This combination takes time into consideration.

The update detector output with system compensation function H2 module 430 introduces a compensating function to account for the slow periodic-like probe. A novel way to map sparse network events into a moving average frequency domain representation is used by update detector output with system function H2 module 430.

A new system compensation function H2 that is sensitive to when events occur in time as well as how many events occur over all observed time is introduced. This method can distinguish bursts of many events spaced far apart in time from the same number of events spaced closely in time.

The method has the added advantage of smoothing the number of events in a time interval regardless of what type of protocol carries the network packets. A uniformly sampled time series of macro events, from buckets of microevents, is created. In fact, attenuation function H1 also benefits from this bucket approach to smoothing the input to the attenuation function.

As explained more completely in commonly assigned U.S. patent application Ser. No. 10/866,431, entitled "Structures and Methods for a Low and Slow Network Reconnaissance Detector" of Paul Agbabian and Bruce McCorkendale filed on Jun. 10, 2004, the macro events are processed to estimate a moving average of frequency content that represents the spacing in time of the macro events. Frequency sensitive system compensation function H2 processes the output of low-frequency low-amplitude attenuation function H1 and compensates for attenuations that occur when macro events are spaced far apart in time. Thus, interest level M(IP_j) remains closer to the initial valued when burst of occurrences of events with source IP address IP_j are separated far apart in time.

A secondary indicator is the rate of change of the magnitude of interest level M(IP_j) that indicates when a surveillance probe accelerates into an attack. Although the interest level magnitude itself may diminish, the secondary indicator increases dramatically only when the primary indicator, interest level M(IP_j), formerly had a significant value.

Using low and slow reconnaissance detector 126 (FIG. 5) a network security event A is defined as a set of IP addresses whose interest level M(IP_j) is greater than some specified level a i.e., $$A=\{IP\_\_|M(IP\_\_j)>a\}.$$

Since the same attacker may be probing via different IP addresses over time, it is of interest to know that the relatively infrequent visits to network 110 (FIG. 1) are related.

Geo-location detector 127B (FIG. 5) also receives each network event. For a first occurrence of a network event having a unique characteristic, e.g., a first of a network event having a new source address, geo-location detector 127B generates a location identifier L_j that is associated with the unique characteristic.

A common location event B (FIG. 5.) is defined as a set of IP addresses that resolve to the same location L which is defined as IP addresses having a location identifier L_j that satisfies a location criterion k, where k is a constant location coordinate, i.e., $$B=\{IP\_\_i|L\_\_j=k\}$$

Note that a location criterion k may represent a radius or geographical area within which all IP addresses are considered equivalent in space.

A geo-location security event C (FIG. 5) is defined as network security event A such that location L is a constant (i.e. the interesting IP addresses that all resolve to the same location L).

$$C=\{A|B\}$$

Figure 5:
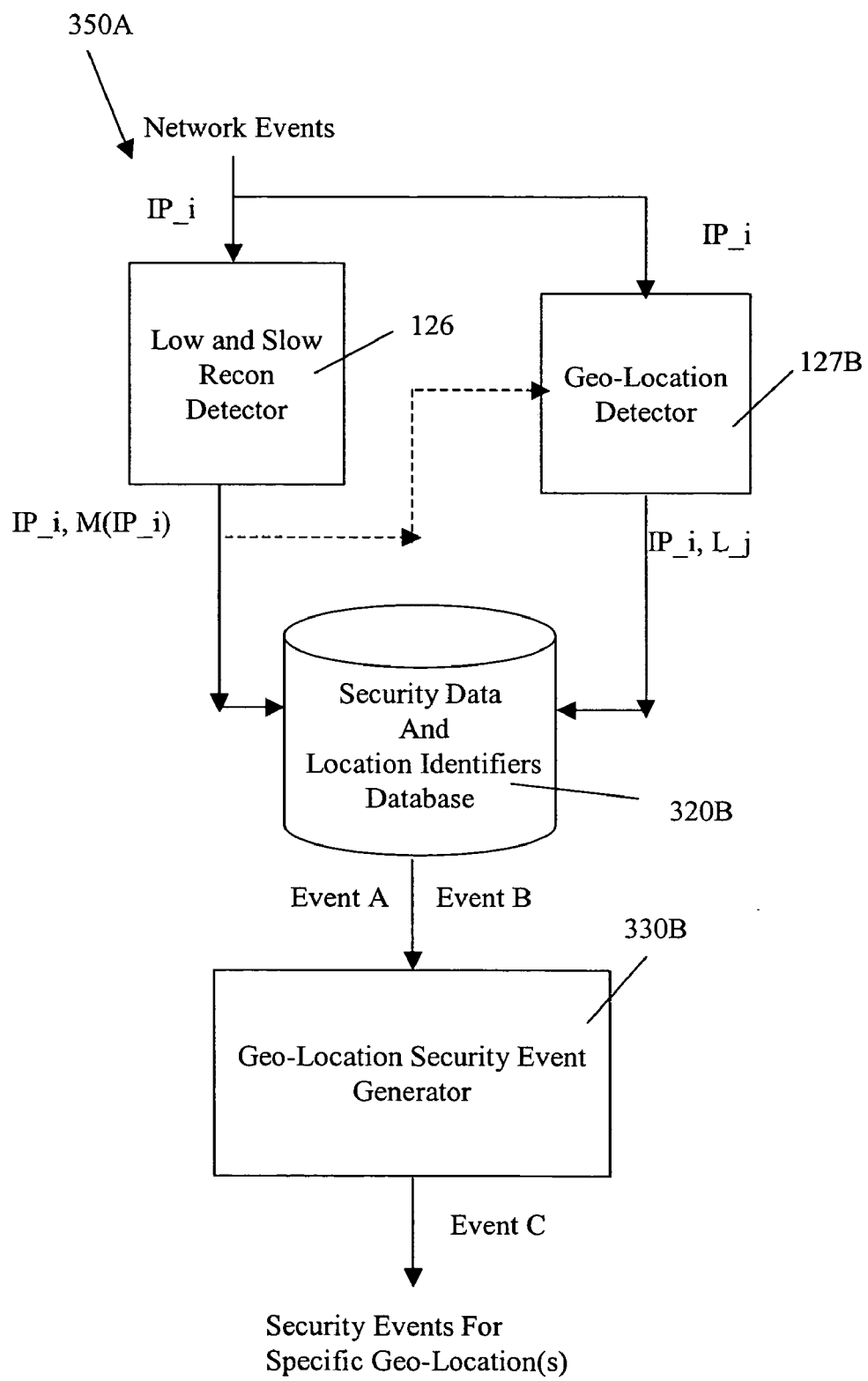
FIG. 5 is an embodiment of the system of FIG. 3B where the security event detector is a low and slow reconnaissance detector, according to one embodiment of this invention.

Thus, in this embodiment, the first occurrence of every source address is passed through geo-location detector 127B (FIG. 5), for example. A location identifier L_j is recorded along with source address associated with the network event. When network security event A is evaluated (that is the lines of the IP address spectrum that are of interest are selected) the lines in the spectrum are be grouped by location identifier L_j that satisfy the location criterion to determine one or more geo-location security events C (FIG. 5).

This technique can be used for general security related queries, or trends, but in particular facilitates a finite memory implementation for real-time detection of clusters of source addresses that can have a single identity. A similar system to the above embodiments of the geo-location detectors can distinguish the type of connection used by an identity, e.g. dial-up, VPN, etc.

Those of skill in the art will understand that when it is stated that an application, a module or an operation takes some action, the action is the result of executing one or more instructions by a processor, or alternatively the action is the result of automated hardware. While embodiments in accordance with the present invention have been described for a computer system 120, an embodiment of the present invention may be carried out using any suitable hardware configuration involving a personal computer, a workstation, a portable device, or any other device found on a network such as an intrusion detection system or a firewall for example. The network configuration is not essential to this invention and can be a client-server configuration, a peer-to-peer, a web-based, an intranet, or the Internet or combinations of these configurations.

As used herein, a computer memory refers to a volatile memory, a non-volatile memory, or a combination of the two. Herein, a computer program product comprises a medium configured to store or transport computer readable code for any one, all or any combination of the methods and structures described herein. The computer readable code could be for all or any part of the various embodiments of low and slow network reconnaissance detector 126 and/or geo-location detector 127. Some examples of computer program products are CD-ROM discs, DVDs, ROM cards, floppy discs, magnetic tapes, computer hard drives, servers on a network and signals transmitted over a network representing computer readable code.

The medium may belong to the computer system itself. However, the medium also may be removed from the computer system. This could be accomplished in a client-server system, or alternatively via a connection to another computer via modems and analog lines, or digital interfaces and a digital carrier line.

In one embodiment, a computer-program product comprises a computer-readable medium containing computer program code for a method including:
 processing a network event with a security event detector; and
 processing data associated with the security event detector with a geo-location detector.

In another embodiment, a computer-program product comprises a computer-readable medium containing computer program code for a method including:
 processing a plurality of network events with a security event detector to identify a set of network events having a common source address and to generate a network security event for the set of network events; and
 processing a first occurrence of a network event having the source address in the plurality of network events with a geo-location detector to generate a location identifier for the network event having the source address wherein a plurality of location identifiers are generated.

In yet another embodiment, a computer-program product comprises a computer-readable medium containing computer program code for a method including:
 processing network events using a low and slow reconnaissance detector wherein the low and slow reconnaissance detector generates a interest level for each set of unique network events thereby generating a plurality of interest levels; and
 processing the network events using a geo-location detector wherein the geo-location detector generates a location identifier for each set of the unique network events thereby generating a plurality of interest locators.

In general, a computer program product may include all, some, one of computer program code for the embodiments of the methods disclosed herein. In other embodiments, part of the computer program code for an embodiment of a method may be included in one computer program product and another part of the computer program code included in another computer program product.

As illustrated in FIG. 1, this medium may belong to computer system 120 itself. However, the medium also may be removed from computer system 120. For example, geo-location detector 127 and/or low and slow detector 126 may be stored in a memory 122 that is physically located in a location different from processor 121. Processor 121 should be coupled to the memory 122. This could be accomplished in a client-server system, or alternatively via a connection to another computer via modems and analog lines, or digital interfaces and a digital carrier line.

More specifically, in one embodiment, host computer system 120 is a portable computer, a workstation, a two-way pager, a cellular telephone, a digital wireless telephone, a personal digital assistant, a server computer, an Internet appliance, a firewall, an intrusion detection system, or any other device that includes components that can execute the geo-location detector functionality in accordance with at least one of the embodiments as described herein. Similarly, in another embodiment, host computer system 120 is comprised of multiple different computers, wireless devices, cellular telephones, digital telephones, two-way pagers, or personal digital assistants, server computers, firewalls, intrusion detection systems, or any desired combination of these devices that are interconnected to perform the methods as described herein.

In another embodiment, load balancing techniques are employed to balance the processing across multiple geo-location detectors as those of skill in the art will understand in light of this disclosure.

In view of this disclosure, the geo-location detector in accordance with one embodiment of present invention can be implemented in a wide variety of computer system configurations. In addition, the geo-location detector functionality could be stored as different modules in memories of different devices. For example, geo-location detector 127 could initially be stored in a server system, and then as necessary, a portion of geo-location detector 127 could be transferred to a system and executed on that system. In view of this disclosure, those of skill in the art can implement various embodiments of the present invention in a wide-variety of physical hardware configurations using an operating system and computer programming language of interest to the user.

In yet another embodiment, geo-location detector 127 is stored in a memory of a server system. Geo-location detector 127 is transferred, over a network to memory 122 in another system.

Also, the various computer systems, networks, computer program code, storage devices, memory structures etc taken together in appropriate combinations are means for achieving the functionality described herein. For example, in one embodiment, a structure includes:

means for processing a network event with a security event detector; and means for processing data associated with the security event detector with a geo-location detector.

In another embodiment, a structure includes:

means for processing a plurality of network events with a security event detector to identify a set of network events having a common source address and to generate a network security event for the set of network events; and means for processing a first occurrence of a network event having the source address in the plurality of network events with a geo-location detector to generate a location identifier for the network event having the source address wherein a plurality of location identifiers are generated.

In still yet another embodiment, a structure includes:

means for processing network events using a low and slow reconnaissance detector wherein the low and slow reconnaissance detector generates a interest level for each set of unique network events thereby generating a plurality of interest levels; and means for processing the network events using a geo-location detector wherein the geo-location detector generates a location identifier for each set of the unique network events thereby generating a plurality of interest locators.

This disclosure provides exemplary embodiments of the present invention. The scope of the present invention is not limited by these exemplary embodiments. Numerous variations, whether explicitly provided for by the specification or implied by the specification or not, may be implemented by one of skill in the art in view of this disclosure.

We claim:

1. A method for characterizing events on a network comprising:

processing a plurality of network events with a security event detector to identify a set of network events having a common source address and to generate a network security event for the set of network events, wherein said processing a plurality of network events with a security event detector to identify a set of network events having a common source address and to generate a network security event for the set of network events further comprises:

generating an interest level for each set of network events having a common source address thereby generating a plurality of interest levels; and processing a first occurrence of a network event having the source address in the plurality of network events with a geo-location detector to generate a location identifier for the network event having the source address wherein a plurality of location identifiers are generated with each location identifier in said plurality being associated with a different source address.

2. The method of claim 1 further comprising:

comparing location identifiers in the plurality of location identifiers with a location criterion.

3. The method of claim 2 further comprising:

grouping location identifiers having a predefined relationship with the location criterion to generate a common location event comprising a set of source addresses and associated location identifiers.

4. The method of claim 2 further comprising:

using the common location event and the network security event to generate a geo-location security event.

5. The method of claim 1 wherein the processing a plurality of network events with a security event detector to identify a set of network events having a common source address and to generate a network security event for the set of network events further comprises:

selecting a set of interest levels from the plurality of interest levels wherein each interest level in the set has a specified relationship to a threshold interest level.

6. A structure comprising:

means for processing a plurality of network events with a security event detector to identify a set of network events having a common source address and to generate a network security event for the set of network events, wherein said means for processing a plurality of network events with a security event detector to identify a set of network events having a common source address and to generate a network security event for the set of network events further comprises:

means for generating an interest level for each set of network events having a common source address thereby generating a plurality of interest levels; and means for processing a first occurrence of a network event having the source address in the plurality of network events with a geo-location detector to generate a location identifier for the network event having the source address wherein a plurality of location identifiers are generated with each location identifier in said plurality being associated with a different source address.

7. A computer-program product comprising a computer-readable medium containing computer program code for a method comprising:

processing a plurality of network events with a security event detector to identify a set of network events having a common source address and to generate a network security event for the set of network events,
  wherein said processing a plurality of network events with a security event detector to identify a set of network events having a common source address and to generate a network security event for the set of network events further comprises:
    generating an interest level for each set of network events having a common source address thereby generating a plurality of interest levels; and
  processing a first occurrence of a network event having the source address in the plurality of network events with a geo-location detector to generate a location identifier for the network event having the source address wherein a plurality of location identifiers are generated with each location identifier in said plurality being associated with a different source address.

8. A system comprising:
a processor; and
a memory coupled to the processor, and having stored therein instructions for a method for characterizing events on a network wherein upon execution of the instructions using the processor, the method comprises:
  processing a plurality of network events with a security event detector to identify a set of network events having a common source address and to generate a network security event for the set of network events,
    wherein said processing a plurality of network events with a security event detector to identify a set of network events having a common source address and to generate a network security event for the set of network events further comprises:
      generating an interest level for each set of network events having a common source address thereby generating a plurality of interest levels; and
    processing a first occurrence of a network event having the source address in the plurality of network events with a geo-location detector to generate a location identifier for the network event having the source address wherein a plurality of location identifiers are generated with each location identifier in said plurality being associated with a different source address.

9. A method comprising:
detecting low and slow network reconnaissance by processing network events using a low and slow reconnaissance detector wherein the low and slow reconnaissance detector generates a interest level for each set of unique network events thereby generating a plurality of interest levels; and
processing the network events using a geo-location detector wherein the geo-location detector generates a location identifier for each set of the unique network events thereby generating a plurality of location identifiers with each location identifier in said plurality being associated with a different set of the unique network events.

10. The method of claim 9 further comprising:
selecting a set of interest levels from the plurality of interest levels wherein each interest level in the set of interest levels is equal to or greater than a threshold interest level.

11. The method of claim 10 further comprising:
selecting a set of location identifiers from the plurality of location identifiers wherein each location identifier in the set of location identifiers satisfies a location criterion.

12. The method of claim 11 further comprising:
selecting a subset of interest levels from the set of interest levels wherein each interest level in the subset is associated with a location identifier in the set of location identifiers.

13. The method of claim 12 further comprising:
grouping interest levels in the subset of interest levels by local identifier.

14. A structure comprising:
means for detecting low and slow network reconnaissance by processing network events using a low and slow reconnaissance detector wherein the low and slow reconnaissance detector generates a interest level for each set of unique network events thereby generating a plurality of interest levels; and
means for processing the network events using a geo-location detector wherein the geo-location detector generates a location identifier for each set of the unique network events thereby generating a plurality of location identifiers with each location identifier in said plurality being associated with a different set of the unique network events.

15. A computer-program product comprising a computer-readable medium containing computer program code for a method comprising:
detecting low and slow network reconnaissance by processing network events using a low and slow reconnaissance detector wherein the low and slow reconnaissance detector generates a interest level for each set of unique network events thereby generating a plurality of interest levels; and
processing the network events using a geo-location detector wherein the geo-location detector generates a location identifier for each set of the unique network events thereby generating a plurality of location identifiers with each location identifier in said plurality being associated with a different set of the unique network events.

16. A system comprising:
a processor; and
a memory coupled to the processor, and having stored therein instructions for a method for characterizing events on a network wherein upon execution of the instructions using the processor, the method comprises:
  detecting low and slow network reconnaissance by processing network events using a low and slow reconnaissance detector wherein the low and slow reconnaissance detector generates a interest level for each set of unique network events thereby generating a plurality of interest levels; and
  processing the network events using a geo-location detector wherein the geo-location detector generates a location identifier for each set of the unique network events thereby generating a plurality of location identifiers with each location identifier in said plurality being associated with a different set of the unique network events.

* * * * *

UNITED STATES PATENT AND TRADEMARK OFFICE
CERTIFICATE OF CORRECTION

| | | |
|---|---|---|
| PATENT NO. | : 7,546,637 B1 | Page 1 of 1 |
| APPLICATION NO. | : 10/996019 | |
| DATED | : June 9, 2009 | |
| INVENTOR(S) | : Paul Agbabian and William Sobel | |

It is certified that error appears in the above-identified patent and that said Letters Patent is hereby corrected as shown below:

On the Title page Item 73, replace "Corproation" with --Corporation--;
In Column 12, Line 33, Claim 4, replace "claim 2" with --claim 3--.

Signed and Sealed this

Third Day of November, 2009

David J. Kappos
*Director of the United States Patent and Trademark Office*